LOUIS S. ROBBINS, OF NEW YORK, N. Y., AND JOHN A. SOUTHMAYD, OF ELIZABETH, NEW JERSEY.

Letters Patent No. 87,434, dated March 2, 1869.

IMPROVEMENT IN THE MANUFACTURE OF OAKUM.

The Schedule referred to in these Letters Patent and making part of the same.

*To all whom it may concern:*

Be it known that we, LOUIS S. ROBBINS, of the city, county, and State of New York, and JOHN A. SOUTHMAYD, of Elizabeth, Union county, State of New Jersey, have invented a new and useful Improvement in the Manufacture of Oakum; and we do hereby declare that the following is a full and clear description thereof, which will enable those skilled in the arts to make and use the same.

We employ, in our manufacture, what is known as bamboo, cane, or reed, and we proceed to obtain the fibre therefrom by first cutting out the joints or knots, and then splitting and boiling the cane in caustic alkali, the same as set forth in our specification and application for Letters Patent, dated June 24, 1868.

After the boiling and washing of the bamboo have been completed, it is passed through rolls, or squeezed, for the purpose of expelling all silicious and resinous matter which may be held in solution with the water. It is then dried and saturated with the vapor of tar or other oleaginous substances or compounds, when it is ready for the picker and beater.

The picker, which is similar in its construction to those used for separating the fibres of rope or oakum, opens and separates the fibres of bamboo, cane, or reed, and prepares it for the beating-process, which is accomplished by passing the fibres through a brake constructed like those used for preparing oakum.

This operation renders the fibres more pliable, and prepares them for the subsequent process of carding, which is performed by passing the fibres over coarser and finer cards, so arranged that the carding is completed in one operation.

The fibres of the bamboo are now ready to be used, either separately or in combination with other materials, for caulking vessels, and other useful purposes.

What we claim as new, and desire to secure by Letters Patent, is—

The process of preparing oakum from bamboo, cane, or reed, substantially as herein described.

Also, the use and application of the fibres of bamboo, cane, or reed, either separately or in combination with other materials, for the purpose of oakum, as a new article of manufacture.

LOUIS S. ROBBINS.
JOHN A. SOUTHMAYD.

Witnesses:
NATHANIEL GILL,
WM. H. CLARKSON.